United States Patent [19]
Fagerudd

[11] Patent Number: 5,707,261
[45] Date of Patent: Jan. 13, 1998

[54] HYDROCOPTER

[76] Inventor: Glenn Fagerudd, Söderholmsvägen 85, FIN-68570 Larsmo, Finland

[21] Appl. No.: 737,509
[22] PCT Filed: May 17, 1995
[86] PCT No.: PCT/FI95/00261
§ 371 Date: Nov. 13, 1996
§ 102(e) Date: Nov. 13, 1996
[87] PCT Pub. No.: WO95/31347
PCT Pub. Date: Nov. 23, 1995

[30] Foreign Application Priority Data

May 18, 1994 [FI] Finland .................. 942320

[51] Int. Cl.[6] .................. B63H 7/00
[52] U.S. Cl. .................. 440/37; 114/61; 114/144 R
[58] Field of Search .................. 114/61, 283, 144 R, 114/162, 165, 265, 246, 270, 352, 353; 440/37; 180/235, 265

[56] References Cited

U.S. PATENT DOCUMENTS

| | | | |
|---|---|---|---|
| 2,584,122 | 2/1952 | Gilmore | 114/270 |
| 3,049,186 | 8/1962 | Garrett | 180/235 |
| 3,057,319 | 10/1962 | Wagner | 114/270 |
| 3,176,647 | 4/1965 | Grengs | 440/37 |
| 3,216,391 | 11/1965 | Jones | 114/283 |
| 4,821,663 | 4/1989 | Schad | |

FOREIGN PATENT DOCUMENTS

| | | | |
|---|---|---|---|
| 2413229 | 7/1979 | France | |
| 3423305 | 1/1986 | Germany | 114/61 |

Primary Examiner—Ed L. Swinehart
Attorney, Agent, or Firm—Beveridge, DeGrandi, Weilacher & Young, LLP

[57] ABSTRACT

The present invention relates to a hydrocopter. A hydrocopter is a vehicle by which it is possible to move over water, particularly in an archipelago, under difficult conditions, e.g., during the thaw. The waterproof hull of the hydrocopter bears against the underlying surface, such as snow, ice, slush or water, and is driven forward by an air propulsion unit mounted on top of the hull. The problem with the current hydrocopters is that they are very difficult to steer and uncomfortable to ride in. Division of the hydrocopter hull into two portions connected to each other by a hinge joint, in accordance with the invention, makes it possible to use frame steering. This new structure makes the hydrocopter easier to handle. The invention provides a vehicle which has a small turning radius and which is steerable even at very slow speeds.

19 Claims, 2 Drawing Sheets

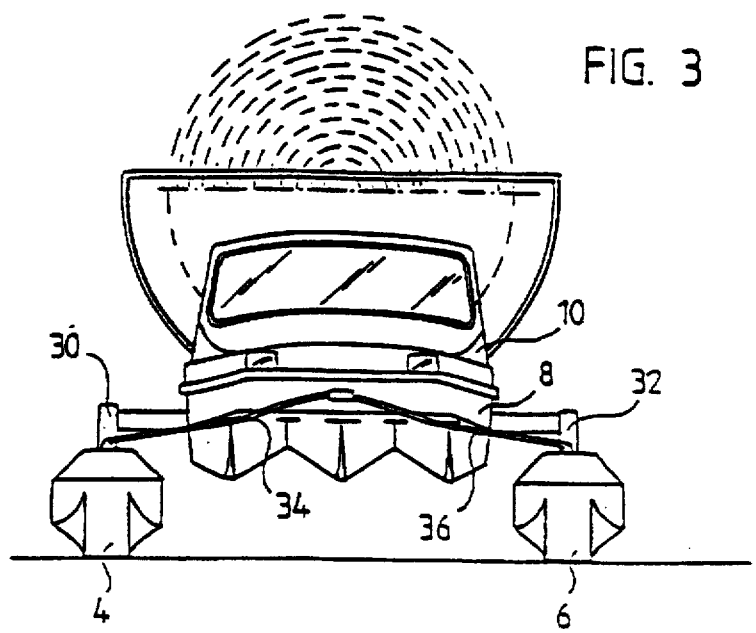
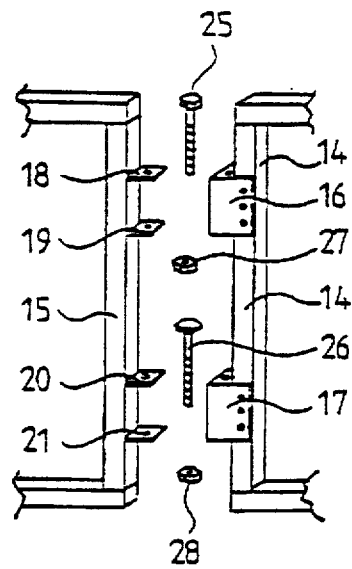
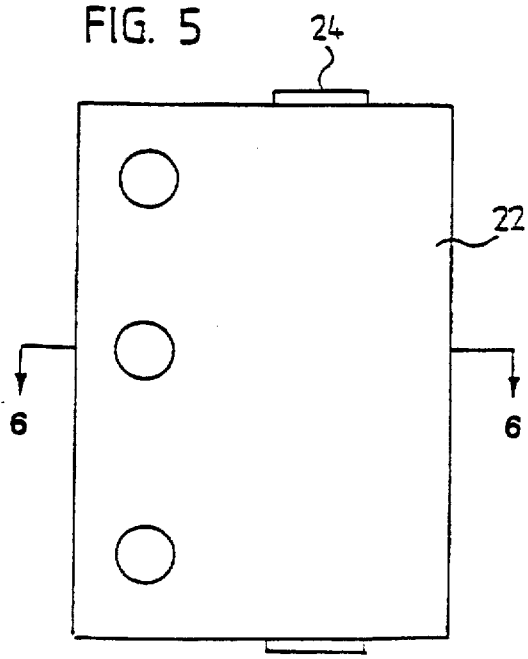
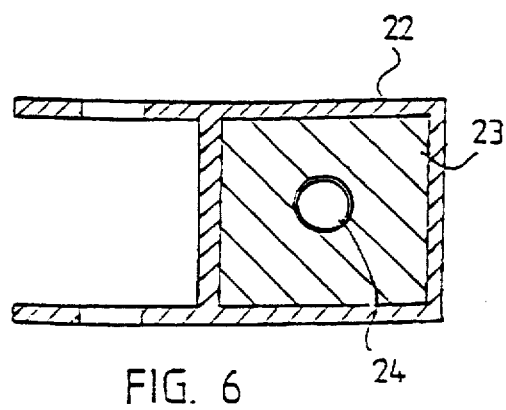

HYDROCOPTER

FIELD OF THE INVENTION

The present invention relates to a hydrocopter. A hydrocopter is a vehicle by which it is possible to move over water, particularly in an archipelago, under difficult conditions, e.g. during the thaw. The waterproof hull of the hydrocopter bears against the underlying surface, such as snow, ice, slush or water, and is driven forward by a propeller mounted on top of the hull.

BACKGROUND DISCUSSION

At present, there are two different types of hydrocopters available, both consisting of a hull driven by a motor positioned behind the hull and provided with a propeller. These hydrocopters are steered by means of air rudders positioned around the propeller. One of the hydrocopters available on the market is, in addition, provided with resilient wheels and skis on both sides of the hull, which makes the hydrocopter more comfortable to ride in on solid ice or snow.

The problem with the current hydrocopters is that they are very difficult to steer and uncomfortable to ride in. The hydrocopters are steered by turning the air rudders, whereafter the hydrocopter turns in a wide curve by the action of the resulting changes in the air resistance. A relatively high speed is required in order to produce the steering effect. In addition, the turning radius of the vehicle is large. The conventional hydrocopter is, moreover, difficult to handle under difficult ice conditions. It requires a relatively level underlying surface and cannot, for example, climb over a high edge of ice, as the center of gravity of the hydrocopter is situated so far in the back that, at slow speeds, the motor is not capable of bringing the center of gravity over the edge of ice.

SUMMARY OF THE INVENTION

The problems associated with the existing solutions can be avoided with the present invention.

A solution to the above-mentioned problems is provided by the present invention, which is characterized by what is disclosed in the appended claims.

The hydrocopter according to the present invention is characterized in that its hull comprises a bow and a stern portion, connected to each other by a hinge joint.

The invention is based on the need for a vehicle which is easier to drive on an uneven surface and which retains its steerability even at slow speeds.

The hydrocopter according to the present invention has several significant advantages over the prior art. In the case of a hydrocopter whose hull is divided into two separate portions connected to each other by a hinge joint, it is possible to use frame steering; this makes the hydrocopter considerably easier to steer. Such a vehicle is also more silent, since the motor can be positioned in a part of the hull which is separate from the compartment reserved for the driver and for transport. The bow portion can therefore be more effectively isolated from the vibrations and noise produced by the motor.

If the hydrocopter is, in addition, supported by pontoons connected to the hull pivotedly and resiliently, the riding comfort and steerability are further increased. In a solution according to the present invention, the pontoons absorb most of the bumps and vibrations which the hydrocopter is subjected to. A hydrocopter which is constructed according to the present invention is also easier to drive on an uneven surface or on a surface with sudden, relatively great differences in altitude. The parts of the hydrocopter that are in contact with the underlying surface consist of four pontoons arranged in pairs. The pontoons can be freely turned in relation to the transverse axis of their fixing points. This allows either one pontoon at a time or a pair of pontoons to climb over an edge of ice, for example, even at a very slow speed.

Division of the hydrocopter hull into two portions connected to each other by a hinge joint makes it possible to use frame steering. It also allows the vehicle to be supported by float structures, such as pontoons.

This new structure makes the hydrocopter according to the present invention easier to handle than the solutions of the prior art. The invention provides a vehicle which has a small turning radius and which is steerable even at very slow speeds. This is important, for instance, in areas where there is pack-ice or where there are many or great differences in altitude.

A hydrocopter according to the present invention can move on a clearly more difficult and uneven surface than the known solutions.

BRIEF DESCRIPTION OF THE DRAWINGS

In the following, the invention will be described in greater detail with reference to the accompanying drawings, in which FIG. 3 is a front view of the hydrocopter, FIG. 4 is a detail drawing of the hinge joint which connects the bow and stern portions of the hydrocopter, FIG. 5 shows a bushing of the hinge joint in detail, and FIG. 6 is a cross-section of the bushing of the hinge joint, taken along the line I—I.

DETAILED DESCRIPTION OF THE DRAWINGS

Figure 1:
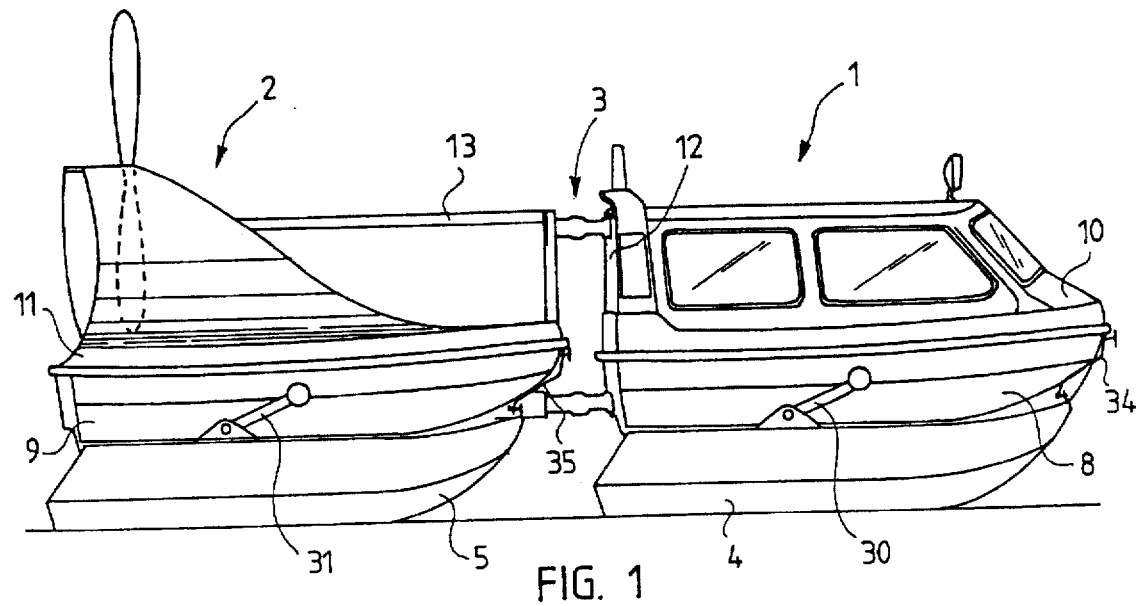
FIG. 1 is a side view of the hydrocopter.
Figure 2:
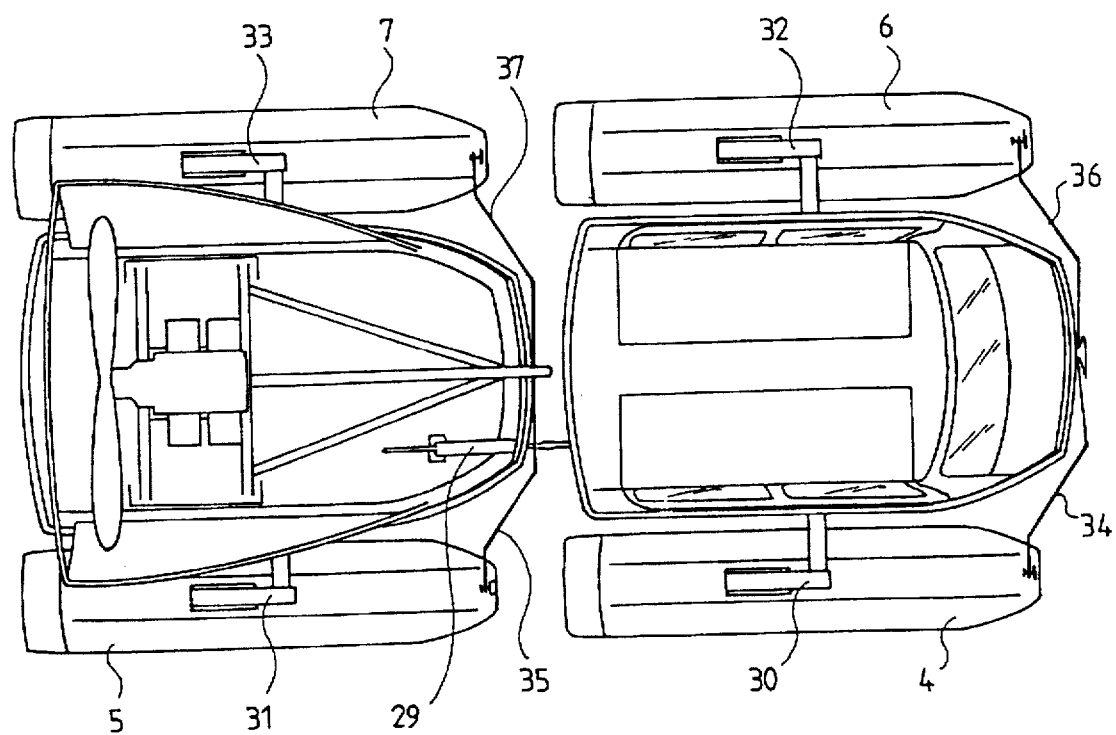
FIG. 2 is a top view of the hydrocopter.

The figures illustrated an embodiment of the hydrocopter according to the present invention.

The hydrocopter comprises a hull, which is divided into a bow and a stern portion 1, 2 connected to each other by means of a hinge joint 3. In addition, the hull comprises pontoons 4, 5, 6, 7, which are provided in pairs at the bow and stern portions, which in turn comprise waterproof bottom portions 8, 9 and superstructures 10, 11 to cover the motor compartment and the compartment reserved for the driver and for transport. The hydrocopter is mainly supported by the pontoons, and thus its friction-generating bottom surface is smaller than in the hydrocopters of the prior art.

The bow and stern portions 1, 2 are provided with frames of steel tube 12, 13, to which the connecting hinge joint 3 is secured. According to FIG. 4, the hinge joint 3 comprises substantially vertical rods 14, 15 provided with bushings 16, 17 and lock plates 18, 19, 20, 21. The lock plates are provided with openings and they are arranged in pairs in such a way that the distance between the two plates in a pair corresponds to the length of the bushing. According to FIGS. 5 and 6, the bushing 16, 17 comprises a housing 22 wherein a piece of resilient rubber 23 has been cast. The rubber secures a tube 24 to the housing. The bushings 16, 17, and the lock plates 18, 19, 20, 21, provided with openings, are connected to each other by pin members 25, 26, e.g. bolts with nuts. The pin member is inserted through the opening in the steel plate disposed at one end of the bushing into the tube inside the bushing so that it finally comes out through the opening in the steel plate disposed at the other end of the bushing. Movement of the pin member in the longitudinal direction of the hinge joint is prevented, for example, by nuts 27, 28 or keys. This provides a connecting hinge joint with two joining points.

The rubber 23 in the bushings 16, 17 absorbs vibrations transmitted to the tube 24 of the hinge joint 3 from the steel tube structure 12, 13. A hinge joint with this structure allows the bow and stern portions to pivot about the joint in horizontal direction, but prevents a turn in the vertical direction of the joint.

The hydrocopter is steered by turning the bow and stern portions 1, 2 about the hinge joint 3 in opposite directions; so-called frame steering is thus used. The bow and stern portions are turned, for example, by means of a hydraulic cylinder 29 the length of which is telescopically increased or reduced. Such a cylinder is provided in both portions of the hull: its mobile end is pivotedly secured to the bow portion, and the cylinder with its control unit is connected to the stern portion. The driver of the hydrocopter indicates in which direction the vehicle shall turn, whereafter the cylinder makes the two portions of the vehicle pivot about the hinge joint by changing its length, and the bow portion will indicate the new course.

The hydrocopter according to the invention is provided with pontoons 4, 5, 6, 7 at the bow and stern portions 1, 2. The hull of the hydrocopter bears against these pontoons. The pontoons are long and narrow, and they are disposed along the sides of the hull. The pontoons are pivotedly connected to supporting arms 30, 31, 32, 33, by which they are resiliently connected to either portion the hull. The hinge joint between a supporting arm and a pontoon is similar to the construction provided between the bow and stern portions. The pontoons move around the transverse axis of the joint at a substantially vertical plane. The turning movements of the pontoons are restricted by rods 34, 35, 36, 37 which are pivotedly connected to both the front end of a pontoon and the front end of the bow or stern portion 1, 2.

The invention is not limited to the embodiment described above, but a number of modifications can be made within the scope of the inventive concept disclosed in the appended claims.

I claim:

1. A hydrocopter having a hull comprising a bow portion (1) having a compartment for a driver and for transport, and a stern portion (2) having a compartment for transport and for a propulsion unit, the propulsion unit comprising a motor and an air propeller for moving the hydrocopter over the underlying surface, characterized in that the bow and stern portions (1, 2) are pivotedly connected to each other by means of a hinge joint (3), and that the bow and stern portions (1, 2) are provided with pontoons (4, 5, 6, 7) which support the bow and stern portions.

2. A hydrocopter according to claim 1, characterized in that the hinge joint (3) comprises at least two joining points.

3. A hydrocopter according to claim 2, characterized in that the hinge joint (3) comprises bushings (16, 17), lock plates (18, 19, 20, 21) provided with openings and positioned at both ends of the bushings, and pin members (25, 26) for connecting the bushings and lock plates rotatably with respect to each other.

4. A hydrocopter according to claim 1, characterized in that the hull is provided with a steering device (29) which makes the bow and stern portions (1, 2) pivot in opposite directions about the hinge joint.

5. A hydrocopter according to claim 4, characterized in that the steering device (29) comprises a cylinder which is connected to the bow and stern portions (1, 2) and the length of which can be changed telescopically.

6. A hydrocopter according to claim 1, characterized in that the pontoons (4, 5, 6, 7) are long and narrow, and they are resiliently connected to the bow and stern portions (1, 2).

7. A hydrocopter according to claim 6, characterized in that the pontoons (4, 5, 6, 7) are pivotedly connected to supporting arms (30, 31, 32, 33), which are pivotedly secured to the bow and stern portions (1, 2).

8. A hydrocopter, comprising:
a hull having a bow portion and a stern portion;
a hinge connecting joint positioned between said bow portion and stern portion such that said bow and stern portions are free to pivot with respect to each other about a vertical pivot axis;
an air propulsion unit mounted on said stern portion;
a first pontoon laterally spaced from a first side of said bow portion;
a first support arm connecting said first pontoon to said bow portion;
a second pontoon laterally spaced from a second, opposite side of said bow portion; and
a second support arm connecting said second pontoon to said bow portion.

9. A hydrocopter according to claim 8, wherein said first pontoon is pivotably connected to said first support arm and said second pontoon is pivotably connected to said second support arm.

10. A hydrocopter according to claim 9, further comprising a first and a second turning movement restriction arm, said first turning movement restriction arm being pivotably connected at one end to a front portion of said first pontoon and pivotably connected at a second end to a front end of said bow portion, and said second turning movement restriction arm being pivotably connected at one end to a front portion of said second pontoon and an opposite end of said second turning movement restriction arm being pivotably connected to the front end of said bow portion.

11. A hydrocopter according to claim 8, further comprising a third pontoon laterally spaced from a first side of said stern portion and a third support arm connecting said third pontoon to said stern portion, said hydrocopter further including a fourth pontoon laterally spaced from a second, opposite side of said stern portion and a fourth support arm connecting said fourth pontoon to said stern portion; and wherein each of said first, second, third and fourth pontoons are pivotably connected to said hull by said first, second, third and fourth support arms such that said pontoons are free to pivot about a horizontal axis extending perpendicular to a direction of travel of said hydrocopter.

12. A hydrocopter according to claim 8, wherein said air propulsion unit includes an air propeller and said air propulsion unit is mounted in an open, top portion of said stern portion.

13. A hydrocopter according to claim 8, further comprising a steering device connected between said bow and stern portions.

14. A hydrocopter according to claim 13, wherein said steering device is an expandable and contractible member laterally spaced from said hinge connecting joint so as to pivot said bow and stern portions in opposite directions about said hinge connecting joint upon expansion and contraction.

15. A hydrocopter according to claim 14, where said expandable and contractible member is a telescoping, hydraulic cylinder assembly.

16. A hydrocopter according to claim 8, wherein said hinge connecting joint includes a bushing having a housing and a rubber block received within said housing, said rubber block having a through-hole within which is received a tube member, said hinge connecting joint further comprising a pair of bracketing members which are pivotably connected with said housing through a pivot member extending between said bracketing members and through said tube member positioned between said bracketing members.

17. A hydrocopter according to claim 8, wherein said hinge connecting joint includes first and second, independent pivot connection bushings with said first pivot connection bushing being vertically spaced from said second pivot connection bushing.

18. A hydrocopter, comprising:
   a hull having a bow portion and a stern portion;
   a hinge joint pivotably connecting said bow and stern portions;
   pontoons connected to said hull at opposite sides of said hull;
   an air propulsion unit mounted on said stern portion; and
   an extendable and contractible steering device connected to said bow and stern portions for causing said bow and stern portions to pivot in opposite directions about the hinge joint.

19. A hydrocopter, characterized in that a hull of said hydrocopter comprises a bow and a stern portion connected to each other by means of a hinge joint with the hinge joint comprising at least two joining points, and in that the hull is provided with a steering device which makes the bow and stern portions pivot in opposite directions about the hinge joint, and said hull supporting an air propeller propulsion assembly.

* * * * *